UNITED STATES PATENT OFFICE.

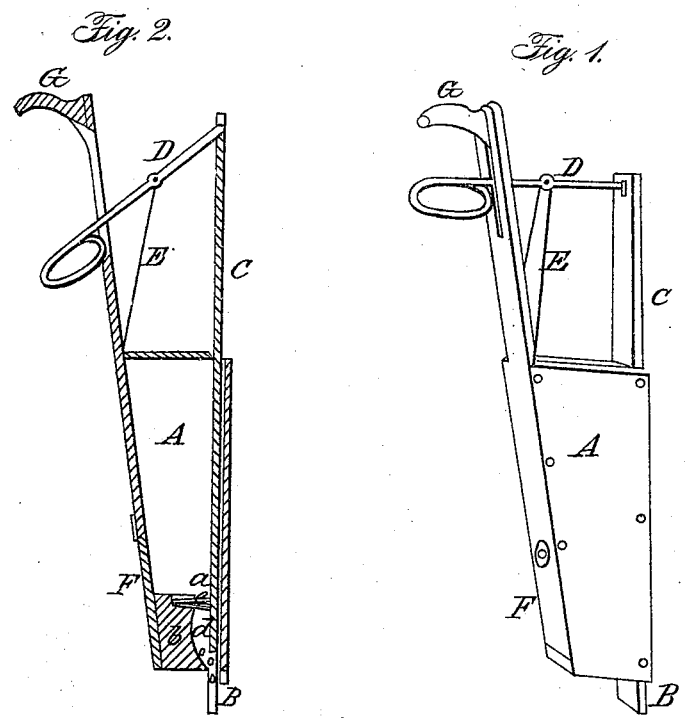

S. G. RANDALL AND J. H. JONES, OF ROCKTON, ILLINOIS.

IMPROVEMENT IN SEED-PLANTERS.

Specification forming part of Letters Patent No. 13,401, dated August 7, 1855.

*To all whom it may concern:*

Be it known that we, SILAS G. RANDALL and JAMES H. JONES, of Rockton, in the county of Winnebago, State of Illinois, have invented certain new and useful Improvements in Seed-Planters; and we do hereby declare that the following is a full, clear, and exact description of the same, reference being had to the accompanying drawings, and reference of letters thereon, making a part of this specification, of which—

Figure 1 is an exterior or perspective view of the machine, showing the seed-reservoir A, with its receiving-slide F, the oscillating lever D, the radial fulcrum E, the vertical reciprocating tongue C, the forcing-handle G, and the depositing-sheath B. Fig. 2 is a side section of the machine, the same letters referring to like exterior parts as in Fig. 1. The internal parts are the seed-dropping cavity $a$, the solid bottom piece, $b$, the retaining-brush $c$, and the discharging-recess $d$.

The advantages of this machine are simplicity, accuracy, and thoroughness of work, certainty of deposit with no violence done to the seed, (hitherto unattained by plungers,) and an absence of springs and delicate parts.

The nature of our invention consists in so combining an oscillating lever, D, forcing-handle G, radial fulcrum E, reciprocating tongue C, and flat depositing-sheath B that the hand shall grasp both the handle and lever when striking the machine into the earth, thus forming an oblong hole, as if by one solid piece, then, by continuation of the hand downward, depressing the lever, raising and withdrawing the tongue from the sheath, leaving the sheath as a lining to support the sides of the hole until the seed is dropped to the bottom, and afterward returning the tongue to its sheath, in readiness for another stroke, all of which is done by one reciprocation of the hand at each hill.

The full operation is as follows: The slide F being opened, the reservoir A is filled with seed. Place the fingers in the eye of the lelever D and draw it up to the finger G, so that the hand shall grasp both. This presses the tongue C downward until its lower end fills the sheath B, and the dropping-cavity $a$ (which has filled from the reservoir) is moved below the retaining-brush $c$. The seed then slides from the dropping-cavity into the discharging-recess $d$, and rests against the tongue. The machine thus prepared is struck down, and the combined tongue and sheath forced into the ground. The hand then slips off the handle and continues its downward movement, carrying the lever with it, which raises the tongue, frees the seed in the discharging-recess, and allows it to drop to the bottom of the hole in the earth, while at the same time the dropping-cavity is drawn up into the seed-reservoir to refill. The operator, still holding the lever, brings it up to the handle, lifts the machine free from the ground, and the planting is completed, while he is prepared for another hill.

Such being the nature of our improvement in seed-planters, we are aware that in that class which open the soil and deposit the seed by dropping rather than by forcing, a device has been used with a round bivalvular point entering the ground and dividing in such a manner as to displace the earth and drop the seed; also another device, by which a solid naked wedge pierces the soil, and the seed, on its withdrawal, is dropped into the opening; also another device, by which the piston protruding below the drill is driven upward by the pressure of the earth and receiving the seed in a cavity in its side on lifting the machine is pressed down by a spring, and discharges the seed against the earth, while the piston fills the hole in the ground. We therefore do not claim any of these; but

What we claim as our invention, and desire to secure by Letters Patent, is—

The use of a sheath and a tongue filling it, so combined with a lever and forcing-handle that by means thereof, or their equivalents, the sheath and tongue may be struck into the ground as one solid piece, after which the tongue may be raised, leaving the sheath in the earth as a lining until the seed is deposited through the lining.

SILAS G. RANDALL.
JAMES H. JONES.

Witnesses:
M. S. COOK,
W. R. WILD.